United States Patent [19]

Egner et al.

[11] Patent Number: 5,573,282
[45] Date of Patent: Nov. 12, 1996

[54] LOW TURBULENCE JOINT FOR LINED SLURRY PIPELINE

[75] Inventors: Randall H. Egner; Dale A. Kneller, both of Durango, Colo.

[73] Assignee: United Pipeline System, USA, Inc., Durango, Colo.

[21] Appl. No.: 390,244

[22] Filed: Feb. 16, 1995

[51] Int. Cl.⁶ .................................................. F16L 9/14
[52] U.S. Cl. ............................ 285/55; 285/236; 138/109
[58] Field of Search ............................ 285/55, 235, 236; 138/97, 109

[56] References Cited

U.S. PATENT DOCUMENTS

| | | |
|---|---|---|
| 171,440 | 12/1975 | Smith . |
| 246,293 | 8/1881 | Cooman et al. . |
| 250,225 | 11/1881 | Ford . |
| 378,150 | 8/1888 | Rowand . |
| 457,246 | 11/1891 | Blattner . |
| 508,765 | 11/1893 | Rouse . |
| 521,122 | 6/1894 | Martin . |
| 612,455 | 10/1898 | Gore . |
| 923,890 | 6/1909 | Puffer . |
| 1,258,166 | 3/1918 | Vollman . |
| 1,360,005 | 11/1920 | Moore . |
| 1,802,665 | 4/1931 | Monteux . |
| 2,070,291 | 2/1937 | McHugh . |
| 2,081,021 | 4/1937 | Smith et al. . |
| 2,088,922 | 8/1937 | Porteus . |
| 2,192,739 | 3/1940 | Goetze . |
| 2,201,862 | 5/1940 | Heisterkamp . |
| 2,216,033 | 9/1940 | Hopkins ................................ 285/55 X |
| 2,291,709 | 8/1942 | Goetze . |
| 2,308,307 | 1/1943 | Robinson ............................ 285/55 X |
| 2,513,178 | 6/1950 | Jackson . |
| 3,120,401 | 2/1964 | Brown . |
| 3,140,105 | 7/1964 | Bielinski . |
| 3,142,499 | 7/1964 | Lang . |
| 3,284,106 | 11/1966 | McIntosh et al. . |
| 3,284,107 | 11/1966 | West . |
| 3,284,108 | 11/1966 | West . |
| 3,291,506 | 12/1966 | Blakeley . |
| 3,342,510 | 9/1967 | Walters . |
| 3,552,776 | 1/1971 | Leymann ............................ 285/55 X |
| 3,563,573 | 2/1971 | Crompton et al. . |
| 3,623,751 | 11/1971 | Hulbert, Jr. ............................ 285/55 |
| 3,650,550 | 3/1972 | West ..................................... 285/55 |
| 3,771,817 | 11/1973 | Schnabel . |
| 4,026,565 | 5/1977 | Jelinek . |
| 4,407,528 | 10/1983 | Anthony ............................. 285/55 X |
| 4,537,425 | 8/1985 | Press et al. . |
| 4,643,457 | 2/1987 | Press ..................................... 285/55 |
| 4,779,903 | 10/1988 | Maier et al. . |
| 4,836,583 | 6/1989 | Maier et al. . |
| 4,943,070 | 7/1990 | Lang . |
| 4,995,427 | 2/1991 | Berchem ............................ 285/55 X |
| 5,005,875 | 4/1991 | Harle . |
| 5,149,142 | 9/1992 | Walko et al. ........................ 285/55 X |
| 5,277,455 | 1/1994 | Graves et al. . |
| 5,308,125 | 5/1994 | Anderson . |

FOREIGN PATENT DOCUMENTS

| | | |
|---|---|---|
| 2607811 | 9/1977 | Germany . |
| 810400 | 3/1959 | United Kingdom . |

*Primary Examiner*—Frank Tsay
*Attorney, Agent, or Firm*—Kenton L. Freudenberg; Maxwell C. Freudenberg

[57] ABSTRACT

A flanged joint assembly for a lined pipeline having a plastic liner and in which the joint is sealed by compression of mating plastic flanges between mating steel flanges and in which plastic flange portions are differentially compressible. Each plastic flange is constructed with a flat sealing face and a thickened outer edge portion in the form of an annular disk. In the assembled joint, compression of the plastic flange is essentially restricted to this thickened flange portion by controlling the size of one of several recesses machined into the face of the steel flange face to accommodate portions of the plastic flanges. A thickened inner annular portion of the circular plastic flange is formed to create a concave frusto-conical surface having its larger circular cross section spaced axially away from the flat sealing face. The concave surface of the plastic flange mates with a corresponding convex frusto-conical surface of another recess machined into the face the respective steel flange thereby creating a wedging or camming effect to prevent radial inward movement of the plastic liner. The structure minimizes distortion of the smooth inner cylindrical surface of the plastic pipe liner at the joint interface which may otherwise occur due to cold flow, creep or displacement of the plastic material. The joint thereby minimizes turbulence of flow within tile pipeline and reduces wear from abrasion which may occur during pipeline transport of abrasive slurry mixtures.

25 Claims, 7 Drawing Sheets

LOW TURBULENCE JOINT FOR LINED SLURRY PIPELINE

BACKGROUND OF THE INVENTION

Figure 7:
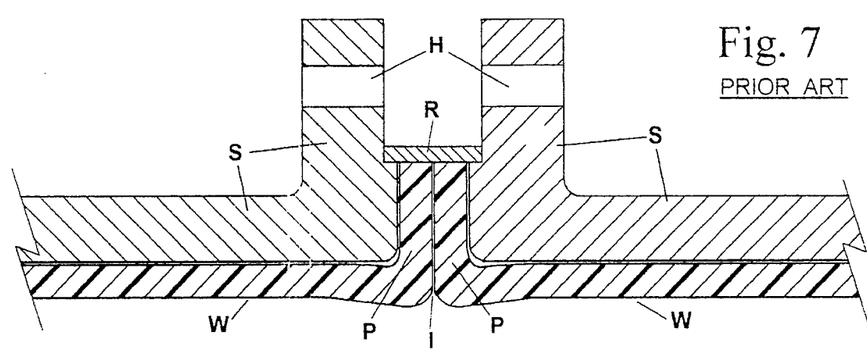
FIG. 7 is a partial cross-sectional view of an assembled a prior art pipeline joint.

In the field of underground pipes and pipelines it has become common to retrofit such pipelines with plastic liners to extend the usable life of these pipelines since the service life of metal pipes may be drastically shortened when such pipes are used to transport corrosive materials or abrasive materials such as slurries in which solid materials are mixed with liquids to allow transport via pipe. A flanged joint in such a lined pipeline is similar to the flanged joint in a steel pipeline. Each of the mating ends of the metal pipeline is fitted with a metal flange capable of being bolted to a similar flange on the opposing mating pipe end. A similar plastic liner flange, usually integral with a short or "stub" end of plastic liner material is attached to each respective mating end of the plastic liner to provide each liner end with a plastic annular flange. In such a typical joint in the prior art as shown in FIG. 7 each plastic flange P is seated snugly against its respective metallic or steel flange S. Assembly of the joint involves bolting the steel flanges together using bolt retaining holes H to uniformly compress the plastic flanges between the steel flanges. A metal retaining band or collar R is provided around the periphery of the plastic flanges and between the metal flanges to radially confine the plastic flanges and provide a precisely sized spacer between the steel flange faces. Such a joint creates a secure seal and may be constructed to be capable of retaining pressures within a pipeline of thousands of pounds per square inch.

However, a common characteristic of plastics, such as high molecular weight polyethylene, which may be used to line a pipeline is that of "cold flow," or "creep", when the material is subjected to compression. The tendency of the material is to plastically deform by moving toward an area of little resistance. As can be most readily understood by viewing the pipeline joint in cross section, each of the mating plastic liner flanges is typically constrained in the directions parallel to the pipe section on one side by abutting the mating plastic flange and on the other side by abutting the respective opposed steel flange. The outer edge of the flanges is constrained against outward radial movement by a metal retaining band or collar R or compressible wound metallic gasket such as that well known in the industry and sold under the trademark as a "Flexitallic" gasket. However there is virtually no resistance to inward radial flow of the liner material other than that inherent in the properties of the plastic material itself. Accordingly, it is not uncommon for "cold flow" of the respective plastic flanges to create irregularities or an annular ridge on the otherwise smooth cylindrical interior surface W of the pipe liner at area adjacent the joint interface face I between the two plastic flanges as is shown in FIG. 7. The ridge, while slight, interrupts the continuous smooth interior surface of the pipe lining and may have the effect of disrupting smooth fluid flow through the pipeline by creating turbulence or "eddy currents" in the area of the pipeline joint. This turbulence is generally undesirable. Where the pipeline may be used to transport abrasives material such as a slurry mixture of liquid and solids, such turbulence can create a much higher degree of abrasive wear of the pipe liner, resulting in a shortened service life of the liner before replacement may be necessary. Obviously then, the elimination or minimization of the causes of any such turbulence is highly desirable for a pipeline used for slurry transportation. By providing a flanged joint in which cold flow resulting from compression of the pipe liner flanges is isolated to a portion of the flange which is not at the joint interface on the interior surface of the liner, the smooth and continuous cylindrical interior surface the liner may be maintained thereby avoiding the difficulties caused by turbulent flow within the pipe liner

SUMMARY OF THE INVENTION

In accordance with the present invention the mating faces of the respective flanges of a metal pipeline joint are machined so as to create several coaxial annular recessed areas or seats to accommodate respective clamped portions of the flanges of a plastic stub flange assembly. Each annular recess of the flange is sized to correspond to an annular section of the plastic flange.

A complete joint assembly is comprised of two mating assemblies, each of which is comprised of a steel pipe flange and a plastic pipe liner flange. Each respective plastic pipe liner flange is provided with a round flat planar sealing face which corresponds to its full axially facing surface area and which is butted against the corresponding flat face of the mating liner flange structure.

On the opposite face from the sealing face, each plastic flange is constructed with a thickened outer edge portion creating a flat rear flange surface in the form of an annular disk which is parallel to the sealing face. In the assembled joint, compression of the plastic flange is essentially restricted to this thickened annular plastic flange portion by controlling the size of a recess machined into the face of the steel flange face to accommodate the thickened edge of the plastic flange.

The surface of an inner portion of the flange opposite the sealing face is thickened into a portion with a trapezoidal or generally wedge shaped cross-section with the thinner of its two parallel edges corresponding in diameter to the inner wall surface of the end of the plastic pipe liner. When the pipeline joint is assembled this wedge shaped portion is accommodated within a similarly sized and shaped annular recess within the steel flange without compression of the plastic so that the plastic is essentially unstressed and the mating wedge shapes of the respective plastic flange portion and steel flange recess prevent or minimize any inward displacement of the inner portion of the plastic flange at the pipe joint.

The steel flange of the present invention may be constructed from an existing flat-faced flange by milling away concentric annular regions from the flat face of such flange. An outermost flat area of each steel flange face surface remains intact to form a buttable mating surface, with the corresponding mating surfaces of each such flange being butted against another in the assembled joint. An annular compression channel is milled into the flange face at a position located radially inwardly from the mating faces. This compression channel is sized to correspond to the thickened edge portion of the plastic flange, having an outer diameter approximately equal to or slightly larger than the outer diameter of the plastic flange. By providing a compression channel of slightly greater diameter than the plastic flange, some of the expected "creep" or "flow" of the compressed plastic material may be accommodated in a radially outward direction and help minimize any tendency toward radially inward movement.

The axial depth of the compression channel is slightly less than the axial thickness of the outer edge portion of the plastic flange so that in the assembled joint the edge portion of the plastic flange is compressed to create a seal sufficient to withstand high fluid pressure within the pipe.

The sealing and retention of the joint between respective portions of plastic pipe liner in the present invention may be accomplished entirely by the configuration of the steel flanges as described herein and without the need for separate external or additional retaining collars. Accordingly, while the steel flanges of the present invention may require specific machining to accomplish their intended purpose, such machining will typically be less expensive than the cost of additional hardware thereby providing a substantial economic benefit. Also since the entire joint assembly of the present invention is assembled using only bolts through the steel flanges, joint assembly is substantially simplified over joints requiring placement, alignment and/or securing of additional hardware such as retaining collars or gaskets. This simplification of assembly may result in improved reliability in joints which may have to be assembled in the field under adverse conditions and a savings of labor time regardless of the assembly conditions.

It is an object of the present invention to provide a joint in a lined pipeline in which cold flow of a compressed flange on the plastic liner material does not affect the smoothness of the interior surface of the liner.

It is an object of the present invention to provide a joint in a lined pipeline in which a portion of each metal pipeline flange provides a retainer for the plastic liner thereby eliminating the need for separate accessory retainers.

It is another object of the present invention to provide a flanged joint in a lined pipeline in which compression of the flange portions of each plastic liner is predetermined and controllable by the depth of a recess within the metallic flange.

It is a further object of the present invention to provide a flanged joint in a lined pipeline in which assembly is simplified by minimizing the need for separate external liner flange retaining hardware.

It is another object of the present invention to provide a flanged joint in a lined pipeline which is likely to be more reliable when assembled under adverse conditions.

It is another object of the present invention to provide a flanged joint in a lined pipeline in which the cost of such a joint is minimized.

Another object of the present invention is to provide a flange connection for a lined pipe having two flanged liners which have coplanar mating or abutting flange surfaces at a plane perpendicular to the axis of the pipe, each of the liner flanges being a structure with two main annular radially spaced liner flange portions which are so contained within the flange connection whereby during assembly an outer axially compressible main liner flange portion is axially compressed and substantially reduced in axial thickness under high pressure between two parallel surfaces of the flanged pipe connection to form and maintain a seal resistant to high liquid pressures within the pipe and whereby an inner main liner flange portion of greater axial length and greater volume than the outer main liner flange portion is contained on three sides with relatively little or no radial or axial compressive forces thereon during assembly so as to maintain, by means of the configuration and strength of the inner main liner flange portion, a smooth cylindrical passage at the inside of the liner over a substantial distance along each respective abutting liner from the transverse plane where the liner flange abuts the mating liner flange of the flange connection.

Another object of the present invention is to obtain an improved sealed flange connection for a lined pipe in accordance with the preceding object wherein each of the outer annular main flange portions is substantially reduced in axial length by compression during assembly of the flange connection with little or no change in volume of the material forming the respective annular main flange portions.

DETAILED DESCRIPTION OF THE INVENTION

For the sake of the simplicity in the discussion of the described embodiments of the present invention the terms "axial" and "radial" are used in relation the pipeline itself. The term "plastic" is used to identify and refer only to the pipe liner and liner flanges and the term "steel" or "metal" will be used to identify and refer only to the exterior pipe which is to be lined and the flanges which are used upon the exterior pipe. It is to be understood that other specific materials may be used within the spirit of the present invention. For example while a particular plastic which is commonly used for pipe liners is high density polyethylene (HDPE), other plastics, elastomers, composites and similar materials may be equally suitable. Similarly, while the exterior pipe is most commonly made of steel, other metals, plastics and/or composites may also be suitable.

Figure 2:
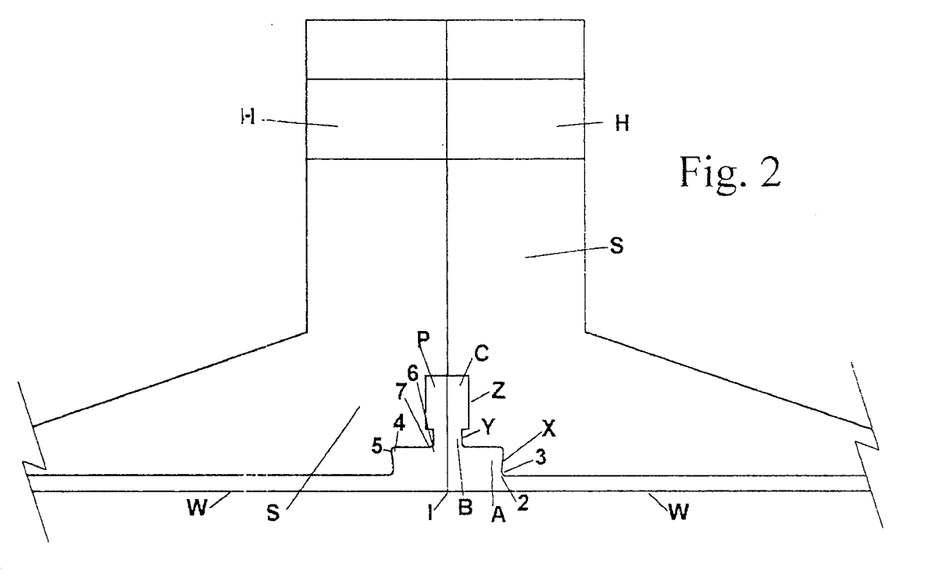
FIG. 2 is a partial cross-section of an assembled pipeline joint of the preferred embodiment having essentially identical mirror-image mating flange assemblies.
Figure 3:
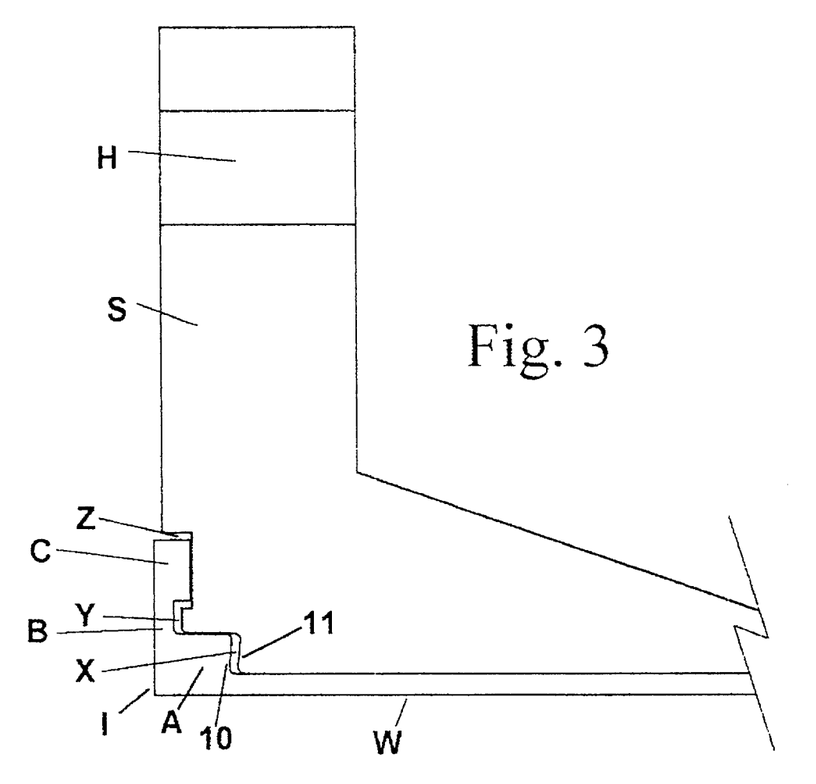
FIG. 3 is a partial cross-sectional view of half of an assembled pipeline joint of the preferred embodiment showing the respective elements prior to assembly.

As seen in FIG. 3, the flange portion of the plastic liner flange member has in its unassembled configuration, when it is unstressed by external clamping forces three annular concentric cylindrical sectors having cross sections represented by letters A, B, and C respectively, A being the innermost annular sector and C being the outermost sector. In FIG. 3 the left end faces of the three radically offset annular sectors A, B and C are coplanar and perpendicular to the axis of the liner and the flange connection. The right end faces of the annular portions B, C and A, in the unstressed configuration of FIG. 3, as well as the clamped configuration of FIG. 2, are relatively axially offset along the axis of the pipe connection with these end faces being located, respectively, at progressively greater distances from the common flat transverse interface surfaces at I. Thus the axial dimensions of the annular portions B, C and A increase progressively in that order.

Similarly, as seen in FIG. 3, the flange portion of the metal pipe flange member has three annular recessed spaces represented by the letters X, Y and Z, X being the innermost annular space and Z being the outermost annular space. In FIG. 3 the left end faces, or bottoms, of the three annular recesses X, Y and Z are recessed on axially offset from the end plane of the pipe flange different distances, the X space being recessed the greatest of the three annular spaces and the Y annular space being recessed the least of the three annular spaces. The three annular spaces X, Y and Z are concentric with and radially offset progressively greater distances from the axis of the pipe connection.

The configurations of the liner flange sectors A and B are essentially complementary to the configurations of the annular spaces X and Y and will nest firmly and snugly together when the flange connection is assembled, preferably with little or no axial compression of the annular liner sectors A and B. However, the axial dimension of the annular cylindrical sector C is greater than the depth of the recessed space Z and the inner and outer radial dimensions of the sector C are such that the sector C will slide into the space Z during assembly until the right end face of the sector C engages the bottom or right face of the annular recess Z. As the sector C slides into the recess Z its outer cylindrical surface may be spaced from the outside wall of the recess Z by approximately 0.100 inches. As the pipe flanges are pulled together by the fastening bolts passing through bolt retaining holes H during assembly of the flange connection, the sector C will be axially compressed until its axial dimension equals the depth of the recess Z. During this compression the radial dimensions of the sector C change so that upon completion of the assembly when the pipe flange surfaces are clamped together, the sector C completely fills the annular space Z with no volumetric change in the material of the sector C, i.e., the radial dimensions of sector C change to abut the inner and outer cylindrical walls defining the recess Z whereby the sector C will be closely confined on all sides and its axial dimension substantially reduced by approximately 20 percent to provide a tight compressive sealing force at the end face of sector C where it will engage a corresponding face of a similarly compressed sector C of a mating flange connection structure.

During assembly of the flange connection the adjacent opposed cylindrical walls of the annular sector A and the recess X are radially spaced by approximately 0.30 inches. Similarly, the adjacent opposed cylindrical walls of the pipe and liner just to the right of sector A and recess X, as seen in FIG. 3, are radially spaced by approximately 0.030 inches.

During assembly, the right end face of the sector A of FIGS. 2 and 3 is tightly pressed against the complementary bottom face of the recess X. These abutting faces are each frusto-conical in shape. As shown in cross section in FIG. 3, the sector A forms a concave conical surface 10 and the bottom of recess X is a convex conical surface 11. These conical surfaces are quite flat, with lines of the conical surfaces intersecting the axis of the flange connection at an angle of approximately 85 degrees. Pressure of the conical surface of sector A against the conical surface of recess X produces a camming or wedging action tending to prevent radial inward movement of the conical surface of sector A or urge radial outward movement of the annular corner 2, where sector A meets the tubular body of the liner, in engagement with the complementary corner 3 of the metal flange. Similarly, tensile stresses applied to the liner flange by the length of liner within the pipe are resisted at the annular corner and again the liner is held against the inside of the pipe by the camming action of the conical surfaces.

Over a range of pipe I.D. sizes and varying pipe wall thicknesses the cross sectional dimensions of the sectors A, B and C and the recesses X, Y and Z may remain substantially the same. For a nominal 10 inch I. D. pipe the radial dimensions of the assembled sectors A, B and C and recesses X, Y and Z, beyond the radius of the cylindrical inside wall of the pipe, are approximately 0.500, 0.250 and 0.750 inches, respectively. The axial dimensions of the assembled sectors A, B,and C and recesses X, Y and Z, are approximately 0.750, 0.195 and 0.295 inches, respectively. The respective axially exposed areas of the recesses X, Y and Z are approximately 34, 8 and 58 percent of the area between the inside diameter of the pipe and the outer wall of the recess Z.

At three locations, (1) the annular corners 2 and 3, (2) the annular corners 4 and 5 away from the end faces of the flanges and at the radius of the cylindrical interface between the sectors A and B, and (3) the annular corners 6 and 7 near the end face of the flanges and at the radius of the cylindrical interface between the sectors A and B, the flanges are provided with rounded or filleted annular corners having radii of 0.060 inches.

The physical properties of the plastic liner may entail a temperature coefficient of expansion and contraction which may be as much as eight times that of the metal pipe. The dimensions of the sectors A both axially and radially are such as to provide hoop strength in each sector A so that any axial stress on the pipe liner would find the first point of failure of the liner at approximately the point 2. Not only is this point kept close to the inner wall of the pipe by the conical surfaces as described above, but also the structure of each sector A minimizes any turbulence-causing disfiguration of the cylindrical inner wall W of the liner at the inner edges of the coplanar interfaces I of abutting liner flanges.

During the assembly of the flange connection of the preferred embodiment an axial compressive force exerted on the liner flange portions C within the chambers Z which provides not only an axial force per unit area, but also a cumulative axial force, on the faces of each flange portion C which is different and substantially greater than the axial cumulative forces or forces per unit area on the liner flange portions A and B.

The volume of the respective chambers Z is such that the high compressive axial forces exerted by the bottom walls of the chambers Z cause flow of the material of the liner flange portions C to substantially fill these chambers with little or no change in the volume of the material forming the liner flange portions C.

The liner flange portions B which are radially intermediate and interconnect, the main liner flange portions A and C are of relatively small axial and radial dimensions and make up a volume in each chamber Y which is approximately 21 percent of the volume of the respective outer annular flange portion C in chamber Z. The inner annular main liner flange portions A are of greater axial length and greater volume than the outer annular main liner flange portions C. These flange portions A are contained on three sides with relatively little or no radial or axial compressive forces thereon and with little or no change in volume during assembly to maintain, by means of the configuration and strength of each inner main liner flange portion A, a smooth cylindrical passage at the inside of the liner over a substantial distance along each respective abutting liner from the transverse plane where the liner flange abuts the mating liner flange of the flange connection. The volume of each compressed flange portion C essentially filling chamber Z is approximately 70 percent of the volume of the respective flange portion A in chamber X. This percentage varies from 67 to 73 percent depending on the wall thickness of the pipe which for a nominal 10 inch pipe varies from 0.134 to 0.843 inches in thickness. The forces applied to the outer liner flange portion C or C' and the intermediate liner flange portions B or B' as the liner flange is changed from unclamped configuration to a tightly clamped configurations are such that the outer flange portion is reduced in axial thickness substantially more than any reduction in axial thickness of the intermediate flange portion.

Figure 4:
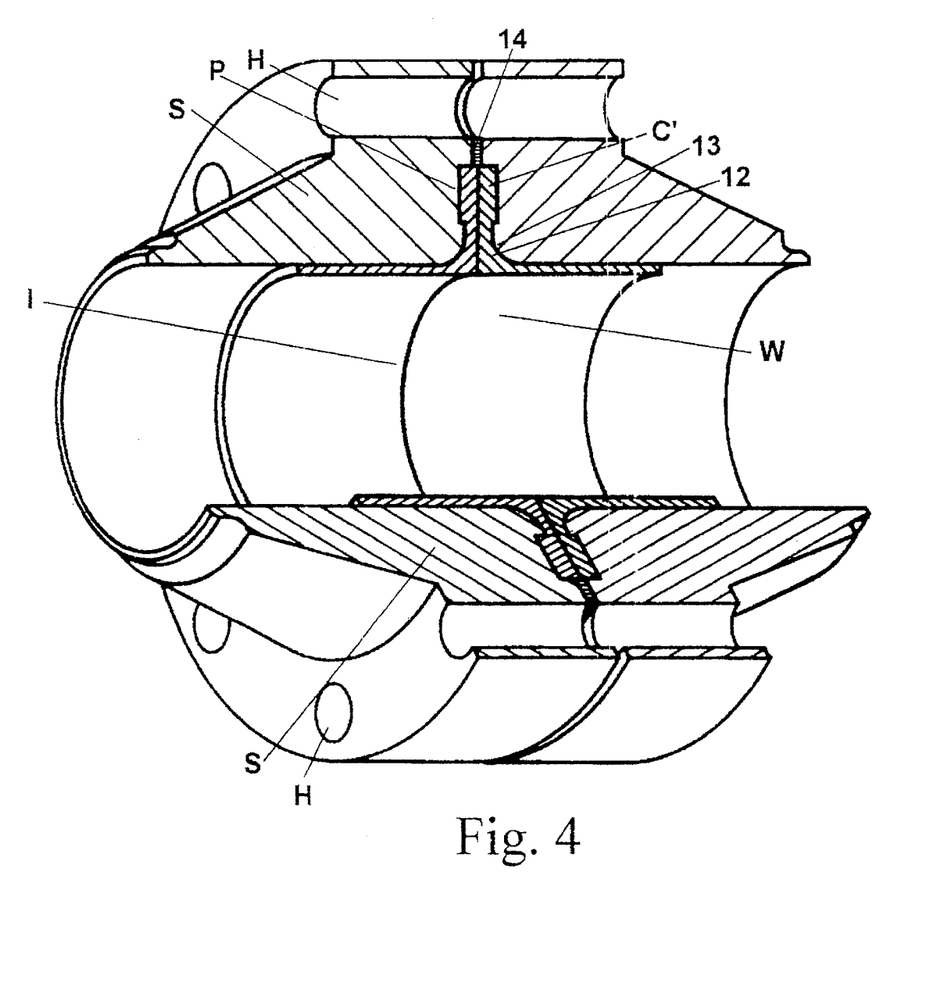
FIG. 4 is a perspective view showing a cross-section of the assembled joint. of an alternative embodiment
Figure 5:
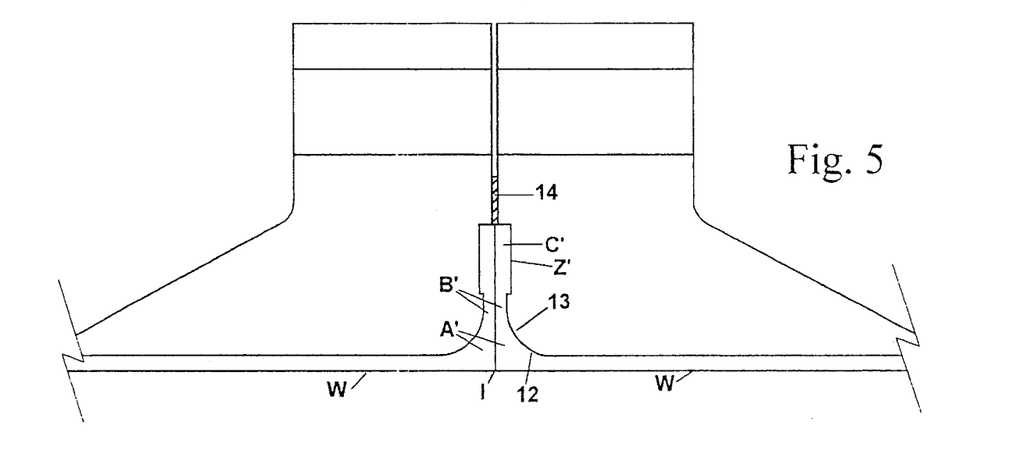
FIG. 5 is a partial cross-section of an assembled pipeline joint of an alternative embodiment
Figure 6:
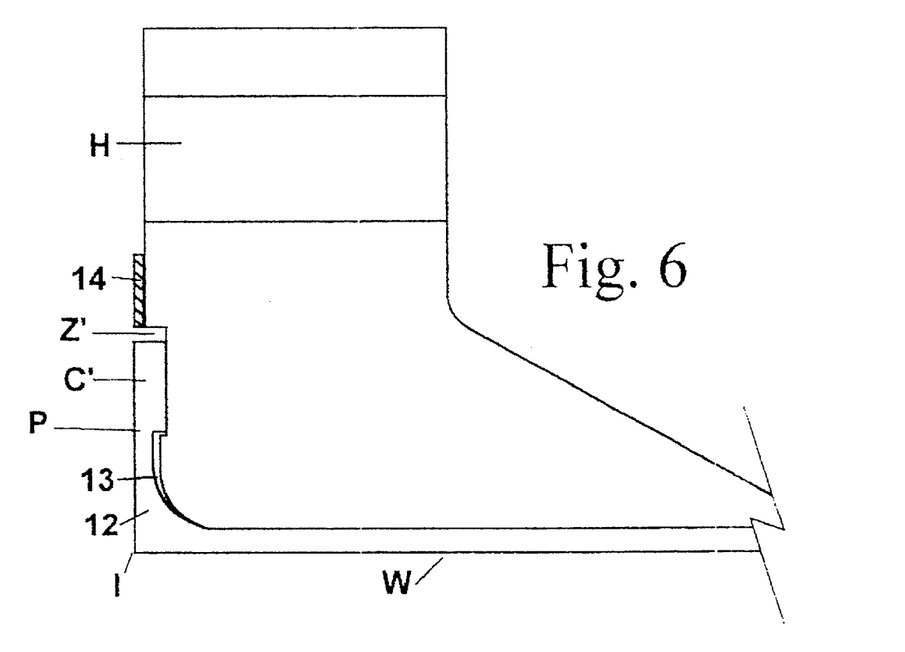
FIG. 6 is a partial cross-sectional view of half of an assembled pipeline joint of an alternative embodiment showing the respective elements prior to assembly.

In an alternate embodiment shown in cross section in FIGS. 4–6, the interface between the liner flange disk and the outer cylindrical pipe liner surface is radius used to provide a continuous concave surface 12 over an arc of approximately 90 degrees which will seat accurately against a corresponding convex surface 13 of the steel flange. The sealing element of this alternative construction is essentially the same as that described for the preferred embodiment comprising a recessed chamber Z' milled into the steel flange and which is sized to compress and confine a plastic flange portion C'. Here again each liner flange portion C' will be reduced in axial thickness and radially expanded without changing its volume to fill the chamber Z' as these flange portions C' are highly axially compressed with a high axial force between the flat parallel bottom faces of the recessed chambers in the metal pipe flanges.

Figure 1:
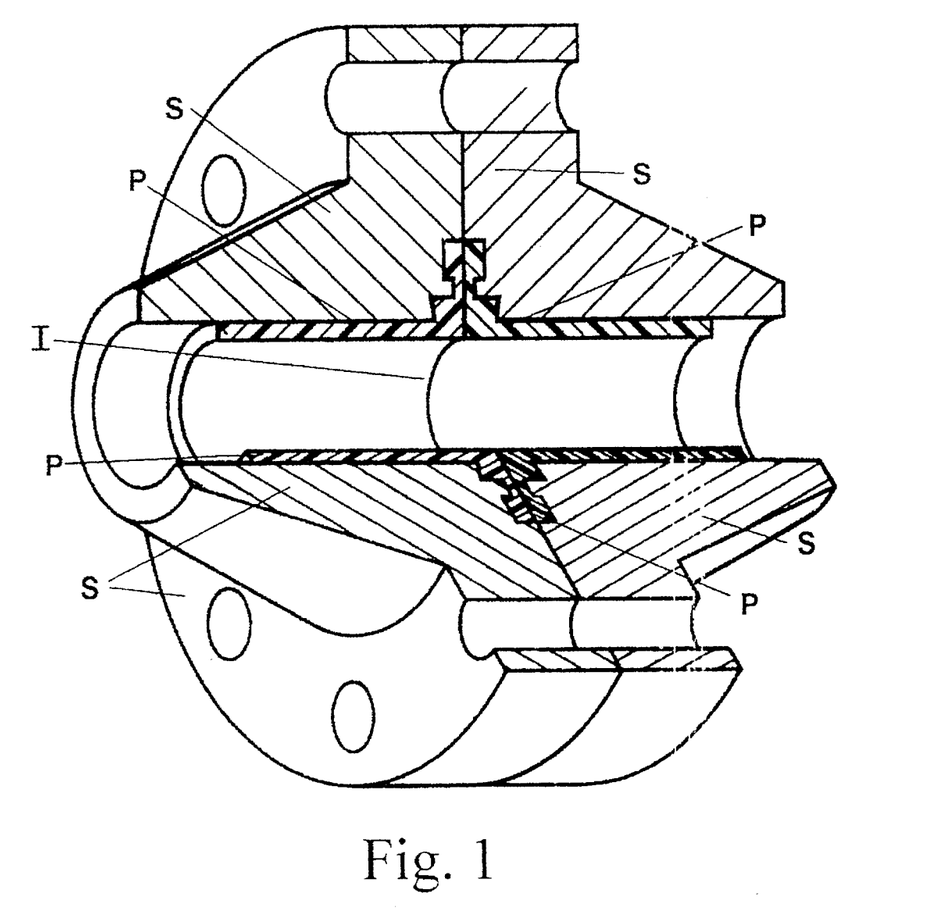
FIG. 1 is a perspective view showing a cross-section of the assembled joint of the preferred embodiment

Additionally, a partially compressible "Flexitallic" wound metallic gasket 14 or similar plastic flange retaining structure having an inner diameter equal to the outer diameter of chamber Z' may be positioned between the faces of steel flanges, in lieu of abutment of the end faces of these pipe flanges as in FIGS. 1-2, and around the periphery of the plastic flanges to form part of the axially extending wall of each of the respective chambers Z' and to provide a secondary seal between the steel flanges. Thus the flange retaining gasket combines with the inwardly facing milled cylindrical wall of the steel flange to provide a means for retaining the outermost portion C' of the plastic flange within the chamber Z'. Such a partially compressible gasket has a known thickness at maximum ression and such thickness must be taken into account in determining the sizing of chamber Z' to achieve the desired axial compression of the compressible portion C' of the plastic flange under high axial compressive force. At the same time the radiused portion of the plastic flange including the thin web-like portion B' adjacent the portion C' and the thicker portion A' near the center of the plastic flange are subjected to no axially compressing forces which will deform the liner at the inner cylindrical wall of the liner so as to avoid any turbulence-causing disfiguration at this inner wall.

Although in each of the illustrated embodiments the flange connection is symmetrical with respect to the plane where the faces of the steel flanges and the plastic flanges abut, the invention is applicable to a flange connection where, for example, half of either embodiment at one side of this plane is held by a high axial force against another similar mating structure having similar flat sealing faces with a coaxial fluid connecting aperture of the same diameter as the inner cylindrical wall of the plastic liner.

Other variations within the scope of this invention will be apparent from the described embodiment and it is intended that the present descriptions be illustrative of the inventive features encompassed by the appended claims.

What is claimed is:

1. A flange connection for a lined pipe having an axial direction of orientation and comprising a pipe end with an annular pipe flange and a liner end within the inside diameter of said pipe end, said liner end having an annular coaxial flange with an annular end face on one side of the liner flange which abuts a surface on another structure to which the pipe flange and liner flange are tightly clamped in the axial direction of the connection in a clamped configuration of the connection, said annular pipe flange having a face engaging an opposite side of the liner flange to clamp the annular liner end face against said another structure, said annular pipe end flange having a first axially recessed annular portion with a bottom face and located radially outwardly spaced from the inside diameter of the pipe end, said annular liner flange having a first annular liner flange portion of a first axial thickness extending from said end face to the bottom face of said recessed annular portion and held in axial compression in said recessed annular portion in said clamped configuration of the connection, said annular liner flange having a second annular liner flange portion of a second axial thickness located radially inwardly of and next to said first annular liner flange portion, said second axial thickness being less than said first axial thickness of said first annular liner flange portion with said second annular liner flange portion being held between said another structure and a second annular portion of said pipe flange face radially inwardly of and next to said first annular recessed portion, said annular liner flange having respective clamped and unclamped thicknesses of said first and second annular liner flange portions whereby the axial forces during clamping to the clamped configuration create a greater reduction in thickness of said first annular liner flange portion to its respective clamped thickness than any reduction in thickness in the second annular liner flange portion as it is clamped to its respective clamped thickness.

2. A flange connection for a lined pipe according to claim 1 wherein said liner flange has a third annular liner flange portion radially inwardly of said second annular liner flange portion, said third liner flange portion being located between said another structure and a third annular portion of said pipe flange face, said third liner flange portion having an external diameter greater than the inside diameter of said pipe end and an axial thickness greater than said first thickness of said first annular liner flange portion.

3. A flange connection for a lined pipe according to claim 2 wherein the face of said pipe flange comprises three stepped annular surfaces extending transversely of the pipe axis for engaging the three respective annular liner flange portions.

4. A flange connection for a lined pipe according to a claim 3 wherein the stepped annular surface of said pipe end flange engaged by said third annular liner flange portion is a covex frusto-conical surface and said third annular liner flange portion has a complementary concave frusto-conical surface mating therewith.

5. A flange connection for a lined pipe according to claim 2 wherein said first annular liner flange portion is compressed with said first thickness about 20 percent less than its uncompressed configuration before being clamped in said flange connection.

6. A flange connection for a lined pipe according to claim 2 wherein there is a large increase in the axially compressive force on said first annular liner flange portion in comparison to the axial forces on the second and third liner flange portions during assembly of said flange connection to its tightly clamped configuration but with little change in relative volume of any of the three annular liner flange portions during such assembly.

7. A flange connection for a lined pipe according to claim 2 wherein said flange connection includes confining means at the outer periphery of said liner flange to prevent any outward flow of the material of said first annular liner flange portion when the liner flange is tightly clamped in said flange connection.

8. A flange connection for a lined pipe according to claim 7 wherein said confining means is an annular portion of said pipe end flange encircling said first annular liner flange portion and engaging said another structure.

9. A flange connection for a lined pipe according to claim 7 wherein said confining means includes an annular high pressure resistant metallic retainer encircling said first annular liner flange portion and clamped between said pipe end flange and said another structure.

10. A flange connection for a lined pipe having an axial direction of orientation and comprising two mating structures each including a pipe end with an annular pipe flange and a liner end within the inside diameter of said pipe end, said liner end and said pipe end of each structure each having an annular coaxial flange with an annular end face surface on one side of each respective flange which abuts a corresponding annular end face surface on the mating structure when the pipe flanges and liner flanges are tightly clamped in the axial direction of the connection, each said annular pipe flange having a face engaging an opposite side of the respective liner flange to clamp the annular liner end face against the mating structure, each said annular pipe end flange having a first axially recessed annular portion with a bottom face and located radially outwardly spaced from the inside diameter of the pipe end, each said annular liner flange having a first annular liner flange portion of a first axial thickness extending from said end face to the bottom face of said recessed portion and held in axial compression in said recessed portion, each said annular liner flange having a second annular liner flange portion of second axial thickness located radially inwardly of and next to said first annular liner flange portion, said second axial thickness being less than said first axial thickness of said first annular liner flange portion with said second annular liner flange portion being held between the mating structure and a second annular portion of said pipe flange face radially inwardly of and next to said first annular recessed portion, each said annular liner flange having respective clamped and unclamped thicknesses of said first and second annular liner flange portions in the flange connection whereby the axial forces during clamping to the clamped configuration create a greater reduction in thickness of said first annular liner flange portion to its said clamped thickness than any reduction in thickness in the second annular liner flange portion as it is clamped to its said clamped thickness.

11. A flange connection for a lined pipe according to claim 10 wherein each said liner flange has a third annular liner flange portion radially inwardly of said second annular liner flange portion, said third liner flange portion having an external diameter greater than the inside diameter of said pipe end and an axial thickness greater than said first thickness of said first annular liner flange portion.

12. A flange connection for a lined pipe having an axial direction of orientation and comprising a pipe end and a liner end within the inside diameter of said pipe end, said ends having respective coaxial flanges with annular end faces which abut corresponding annular surfaces on another structure to which the pipe flange and liner flange are tightly clamped in the axial direction of the connection, said annular end face of the pipe flange encircling said annular end face of the liner flange, the pipe flange having at least two axially recessed annular portions of successively smaller diameters in the radially inward direction from the inner diameter of said annular pipe end face, the annular recessed portion nearest said annular pipe end face defining a first annular recess chamber having an axially facing bottom surface, a second of said annular recessed portion of the pipe flange having a radically extending surface axially recessed from said annular pipe end face a maximum distance which is less than the distance of said bottom surface of said chamber from the annular end face of the pipe flange, the liner having at the radial position of said chamber a first radically outer annular liner flange portion which in an uncompressed state has a configuration of the greater axial dimension than the depth of said chamber, the axial dimension of said radially outer portion when said pipe flange and said liner flange are tightly clamped against said other structure being axially compressed to the depth of said chamber and while under such axial compression said radially outer liner flange portion completely said chamber, the liner flange having at the radial position of said second annular recessed pipe flange portion a second radially extending annular flange portion which in an uncompressed state has a configuration conforming to said second annular recessed portion of the pipe flange whereby said second annular flange portion is under substantially less axial compressive pressure per unit area relative to the axial compressive force per unit area on said first liner flange portion when said pipe flange and said liner are flange tightly clamped against said other structure.

13. A flange connection according to claim 12 wherein said pipe flange has a third annular recessed portion radially inwardly of said second recessed portion and having a depth greater than the maximum depth of said second annular recessed pipe flange portion.

14. A flange connection for a lined pipe according to claim 13 wherein said annular pipe flange end face and the bottom of said chamber are flat parallel annular surfaces.

15. A flange connection for a lined pipe according to claim 13 wherein said third annular pipe flange recessed portion has an axially facing bottom surface which is frusto-conically convex having its smaller annular end near the inner cylindrical wall of the pipe end and diverging outwardly to increase the depth of said third recess as the distance from the axis of the pipe flange increases.

16. A flange connection for a lined pipe according to claim 15 wherein said third annular portion of the liner flange has a frusto-conically concave surface engaging the frusto-conical surface of the third pipe flange recess whereby an axial force on the liner pulling the liner end against the pipe end creates a radially outward force on the axially extending portion of the liner where it extends within the inner cylindrical wall of the pipe flange.

17. A flange connection for a lined pipe according to claim 16 wherein said second and third liner flange annular portions are essentially uncompressed when said pipe flange and said liner flange are tightly clamped against said other structure.

18. An annular pipe liner flange of plastic material for a flange connection of a lined pipe to another structure in which connection the liner flange is clamped between a pipe flange and a flat face of the other structure and wherein the pipe flange has multiple annular clamping portions facing said flat face with the clamping portions being radially offset and axially offset relative to a longitudinal axis of the pipe, said annular liner flange having an annular end face for abutting the flat face on the other structure, said liner flange having multiple radially offset annular portions extending away from said annular end face for engagement with and axial compression at respective radially offset portions of the pipe flange, said liner flange having an innermost annular portion extending axially away from said end face for attachment of the liner flange to a plastic liner for the pipe.

19. An annular pipe liner flange according to claim 18 wherein said pipe liner flange has, in a configuration when unstressed by external clamping forces, at least an outer annular flange portion and a second annular flange portion radially inward of said outer flange portion and of lesser axial dimension than said outer annular portion.

20. An annular pipe liner flange according to claim 19 wherein said pipe liner flange has, in a configuration when unstressed by external clamping forces, a third annular flange portion radially inward of said second flange portion and of greater axial dimension than said outer annular portion.

21. An annular pipe flange for a flange connection of a lined pipe to another structure in which connection a liner flange is clamped between the pipe flange and a flat face of the other structure, said pipe flange having multiple annular clamping portions with the clamping portions being radially offset and axially offset relative to a longitudinal axis of the pipe for engagement with and axial compression of respective radially and axially offset portions of the liner flange, said pipe flange having an annular portion extending axially for attachment of the pipe flange to a pipe.

22. An annular pipe flange according to claim 21 wherein the multiple annular clamping portions of the pipe flange include at least an outer annular clamping portion and a second annular clamping portion radially inward of said outer flange portion which in clamping position of the pipe flange in said connection is closer to said flat face than is said outer annular clamping portion.

23. An annular pipe flange according to claim 22 wherein said pipe flange has a third annular clamping portion radially inward of said second clamping portion and which in clamping position of the pipe flange in said connection is spaced farther axially from said flat face than is said outer annular portion.

24. An annular pipe flange according to claim 23 wherein the pipe flange has a flat annular surface facing axially away from the pipe for engagement with the flat face of the other structure when the liner flange is clamped in the pipe connection.

25. An annular pipe flange according to claim 22 wherein the pipe flange has flat annular surface facing axially away from the pipe for engagement with the flat face of the other structure when the liner flange is clamped in the pipe connection.

* * * * *